(12) United States Patent
Usami

(10) Patent No.: US 6,959,446 B2
(45) Date of Patent: Oct. 25, 2005

(54) OPTICAL INFORMATION RECORDING MEDIUM

(75) Inventor: Yoshihisa Usami, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 145 days.

(21) Appl. No.: 10/382,987

(22) Filed: Mar. 7, 2003

(65) Prior Publication Data

US 2003/0210643 A1 Nov. 13, 2003

(30) Foreign Application Priority Data

Mar. 7, 2002 (JP) ........................................ 2002-062173
Mar. 7, 2002 (JP) ........................................ 2002-062174
Mar. 7, 2002 (JP) ........................................ 2002-062175

(51) Int. Cl.[7] ............................. G11B 7/24; G11B 5/84
(52) U.S. Cl. ...................................... 720/718; 369/286
(58) Field of Search ....................... 720/718; 369/286, 369/275.1, 275.2, 288; 428/64.1

(56) References Cited

U.S. PATENT DOCUMENTS

| | | | |
|---|---|---|---|
| 4,920,359 A | * 4/1990 | Arai et al. | 346/137 |
| 6,028,836 A | * 2/2000 | Kosuda et al. | 369/275.1 |
| 6,040,030 A | * 3/2000 | Utsunomiya et al. | 428/64.1 |
| 6,154,437 A | * 11/2000 | Utsunomiya et al. | 369/275.2 |
| 6,242,066 B1 | * 6/2001 | Yamasaki et al. | 428/64.1 |
| 6,731,590 B1 | * 5/2004 | Shingai et al. | 369/286 |
| 6,808,782 B2 | * 10/2004 | Usami et al. | 428/64.1 |

FOREIGN PATENT DOCUMENTS

| | | |
|---|---|---|
| JP | 61-034745 | 2/1986 |
| JP | 8-279183 | 10/1996 |
| JP | 10-27387 | 1/1998 |
| JP | 200-011453 | 1/2000 |
| JP | 2001-155383 | 6/2001 |
| JP | 2001-273672 | 10/2001 |
| JP | 2001-357571 | 12/2001 |
| JP | 2002-032932 | 1/2002 |
| JP | 2003-115128 | 4/2003 |

* cited by examiner

Primary Examiner—Allen Cao
(74) Attorney, Agent, or Firm—Sughrue Mion, PLLC

(57) ABSTRACT

A disk-shaped optical information recording medium comprising a recording layer, a pressure sensitive adhesive layer or an adhesive layer, and a cover sheet in this order on a substrate, and having a central hole, a track pitch of 300 to 600 nm and a groove depth of 40 to 150 nm, for recording and playing back information by being irradiated with a laser light at a wavelength of 500 nm or less, wherein the substrate and the cover sheet are closely adhered via the pressure sensitive adhesive layer or the adhesive layer at a region including a portion of an inner circumference vicinity and an outer circumference vicinity, and the maximum value for the radial length of the closer adhesion region is at least 0.4 mm.

6 Claims, 7 Drawing Sheets

OPTICAL INFORMATION RECORDING MEDIUM

BACKGROUND OF THE INVENTION

1. Field of the Invention

The present invention relates to an optical information recording medium and, more in particular, it relates to a write-once optical information recording medium by heat mode.

2. Description of the Related Art

Optical information recording media (optical disks) capable of recording information for once using laser light have been conventionally known. The optical disks are also referred to as write-once CDs (so-called CD-Rs) and in a typical structure thereof, a recording layer containing an organic dye, a reflection layer containing a metal such as gold and a protective layer (cover layer) made of a resin are laminated successively in this order on a transparent disk-shape substrate. Information is recorded to the CD-R by irradiating the CD-R with a laser light in a near infrared region (usually, a laser light at a wavelength near 780 nm). An irradiated area of the recording layer absorbs the light to locally increase the temperature, and the optical characteristics of the area are changed by physical or chemical change (for example, formation of pits) to record the information. On the other hand, reading (playback) of information is also conducted by irradiating the CD-R with a laser light at wavelength identical to that of the recording laser light. Reading of information is conducted by detecting the difference of the reflectance between an area where the optical characteristics have changed (recorded area) and an area where they have not changed (non-recorded area) in the recording layer.

In recent years, information recording media of higher recording density are being demanded. In response to such a demand, an optical disk referred to as a write-once digital versatile disk (so-called DVD-Rs) has been proposed (for example, in "Nikkei New Media" Special volume "DVD", issued in 1995). The DVD-R has a structure comprising two disks each formed usually by laminating a recording layer containing an organic dye, a reflection layer and a protective layer in this order on a transparent disk-shape substrate in which guide grooves (pre-grooves) for tracking of laser light to be irradiated are formed at a narrow groove width (0.74–0.8 µm) of one-half or less a groove width of CD-Rs, which two disks are adhered to each other with the recording layers disposed at the inside, or a structure of adhering the disk described above and a disk-shaped protective substrate of the same shape as the disk with the recording layer disposed at the inside. Information is recorded to and played back from the DVD-R by irradiating the DVD-R with a visible laser light (usually, laser light at a wavelength in a region of 630 nm to 680 nm), and recording at higher density than CD-R is possible.

In recent years, networks such as the Internet and high vision TV have become popular rapidly and broadcasting of high definition television (HDTV) will also be started soon. Under the circumstances, optical information recording media of large capacity capable of recording image information conveniently at a reduced cost are required. While DVD-R can sufficiently perform a role as optical information recording media of large capacity at present, demands for larger capacity and higher density have increased more and more and development of optical information recording media capable of coping with such requirement is also necessary. Accordingly, optical information recording media of larger capacity capable of recording at high density by the light of a shorter wavelength compared with that of DVD-R have been under development.

For example, an optical information recording medium comprising, on a substrate, a metal reflection layer, a recording layer and a cover layer, which is thinner than the substrate, stacked in this order on the substrate based on the premise of recording by light transmitted through a lens with high NA, which is suitable to high density recording, has been disclosed. In addition, recording and playback methods of recording and playing back information by being irradiated with laser light at a wavelength of 550 nm or less from the side of the recording layer to the side of the reflection layer have been disclosed. As a dye contained in the recording layer of the optical information recording medium utilizing such short wave laser light, porphyrine compounds, azo dyes, metal azo dyes, quinophthalone dyes, trimethincyanine dyes, dicyanovinylphenyl skeleton dyes, and cumarin compounds are proposed, for example, in JP-A Nos. 4-74690, 7-304256, 7-304257, 8-1271705, 11-53758, 11-334204, 11-334205, 11-334206, 11-334207, 2000-43423, 2000-108513, 2000-149320, 2000-158818, 2000-228028, and 2001-146074). It will be obvious to those skilled in the art that other compounds than described above can also be used, in principle, as dyes for recording layer so long as they are compounds capable of absorbing laser light used for recording. For the laser light for recording and playback, blue-purple color (wavelength at 405 nm or 410 nm), blue color (wavelength at 430 nm or 488 nm), and blue-green color (wavelength at 515 nm) have been proposed.

The optical information recording medium capable of recording and playing back information by the laser light at a short wavelength described above generally has, for example, a reflection layer, a recording layer, a barrier layer, a pressure sensitive adhesive layer or an adhesive layer, and a cover sheet in this order on a substrate, which is different from CD-Rs or DVD-Rs in view of the layer constitution. Accordingly, the irradiation direction of the laser light is opposite to that in CD-Rs or DVD-Rs and problems sometimes occur with peeling of layers, which was not a problem in CD-Rs or DVD-Rs and strong adhesion is required between each of the layers. However, since a boundary liable to be peeled is present in view of the layer constitution in which an organic material (recording layer, etc.) and inorganic material (reflection layer, barrier layer, etc.) in adjacent with each other, sufficient bonding strength sometimes cannot be obtained, leaving room for improvement.

Further, in the optical information recording medium of the layer constitution described previously, the recording layer is externally exposed, particularly at the outer circumferential edge, so that the storability worsens due to atmospheric temperature and humidity.

SUMMARY OF THE INVENTION

The present invention has been accomplished in view of the foregoing problems, and the invention intends to provide an optical information recording medium having high adhesion between each of the layers and having stable recording and playing back characteristics, and an optical information recording medium having high storability and stable recording and playing back characteristics.

A first embodiment of the present invention provides a disk-shaped optical information recording medium comprising a recording layer, at least one of a pressure sensitive adhesive layer and an adhesive layer, and a cover sheet in this order on a substrate, and having a central hole, a track pitch of 250 to 400 nm and a groove depth of 10 to 150 nm, the recording medium for recording and playing back information by being irradiated with a laser light at a wavelength of no more than 500 nm, wherein the substrate and the cover sheet are closely adhered via the at least one of the pressure sensitive adhesive layer and the adhesive layer at a region, which includes at least a portion of at least one of an inner circumference vicinity and an outer circumference vicinity, and a maximum value for a radial length of the closely adhered region is at least 0.4 mm.

Further, a second embodiment of the present invention provides a disk-shaped optical information recording medium comprising a recording layer, a barrier layer, at least one of a pressure sensitive adhesive layer and an adhesive layer, and a cover sheet in this order on a substrate, and having a central hole, a track pitch of 250 to 400 nm and a groove depth of 10 to 150 nm, the recording medium for recording and playing back information by being irradiated with a laser light at a wavelength of no more than 500 nm, wherein the substrate and the barrier layer are closely adhered via the at least one of the pressure sensitive adhesive layer and the adhesive layer at a region, which includes at least a portion of at least one of an inner circumference vicinity and an outer circumference vicinity, and the maximum value for the radial length of the closely adhered region is at least 0.4 mm.

Further, a third embodiment of the present invention provides a disk-shaped optical information recording medium comprising a recording layer, a barrier layer, at least one of a pressure sensitive adhesive layer and an adhesive layer, and a cover sheet in this order on a substrate, and having a central hole, a track pitch of 250 to 400 nm and a groove depth of 10 to 150 nm, the recording medium for recording and playing back information by being irradiated with a laser light at a wavelength of no more than 500 nm, wherein the barrier layer surrounds at least one of an outer circumferential edge and an inner circumferential edge of the recording layer.

DESCRIPTION OF THE PREFERRED EMBODIMENTS

The present invention is to be explained by way of a first embodiment of an optical information recording media.

An optical information recording medium according to the invention is disk-shaped optical information recording medium comprising optionally a reflection layer, a recording layer, optionally a barrier layer, a pressure sensitive adhesive layer or an adhesive layer and a cover sheet in this order on a substrate, and having a central hole, a track pitch of 250 to 400 nm and a groove depth of 10 to 150 nm, for recording and playing back information by being irradiated with a laser light at a wavelength of 500 nm or less, wherein the substrate and the cover sheet are closely adhered via the pressure sensitive adhesive layer or the adhesive layer in at least a portion of regions near the inner circumference and/or near the outer circumference, and the maximum value for the radial length of the close adhesion region is 0.4 mm or more.

Figure 1:
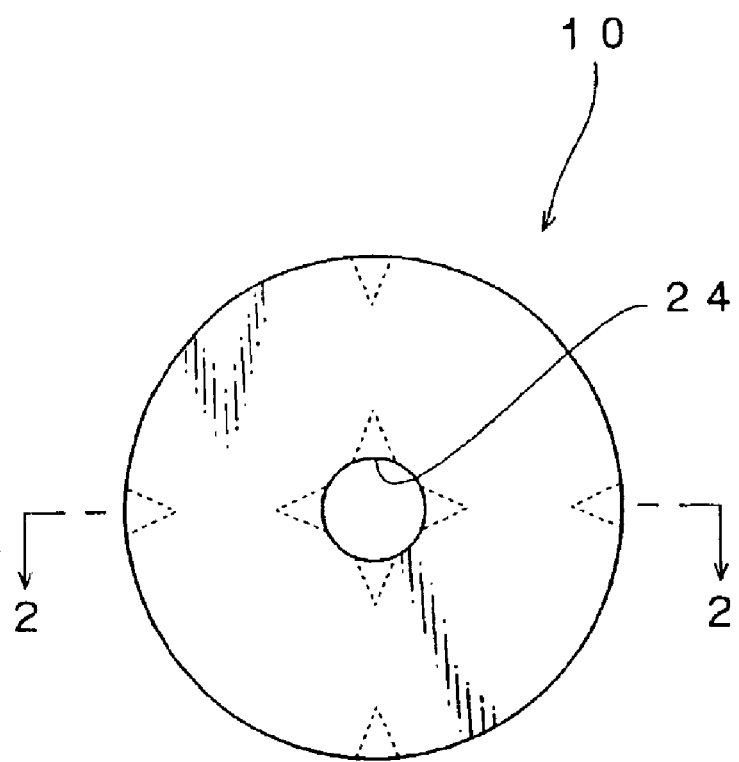
FIG. 1 is an upper plan view showing a disk-shaped optical information recording medium of an embodiment in the present invention.
Figure 2:
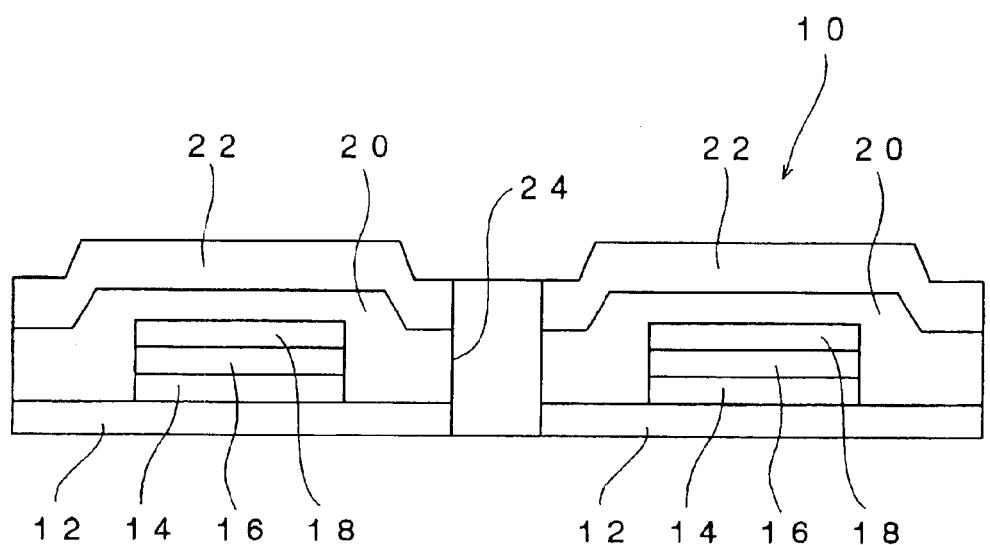
FIG. 2 is a schematic cross sectional view of an example taken along line 2—2 in FIG. 1.

FIG. 1 and FIG. 2 show, respectively, an upper plan view and a schematic cross sectional view of an example of an optical information recording medium of the first embodiment. An optical information recording medium 10 has, on a substrate 12, a reflection layer 14, a recording layer 16, a barrier layer 18, a pressure sensitive adhesive layer 20 and a cover sheet 22 in this order and has a central hole 24 at a central portion. In the optical information recording medium 10, the substrate 12 and the cover sheet 22 are closely adhered via the pressure sensitive adhesive layer 20 at four regions, which are near each of the outer circumference and the inner circumference (hereinafter referred to as "close adhesion region"). The maximum value for the radial length of the close adhesion region at each four position disposed near the outer circumference and near the inner circumference is 0.5 mm. Then, the reflection layer 14, the recording layer 16 and the barrier layer 18 are firmly adhered closely on the substrate 12 by the presence of the close adhesion regions. Accordingly, peeling for each of layers of the optical information recording medium can be prevented. In FIG. 1, the close adhesion regions are disposed at the four positions at each of the outer circumference and the inner circumference but the invention is not restricted only to them. It is preferred that the close adhesion region is provided in plurality or provided over the entire circumference of the outer circumference and the inner circumference.

In the invention, the maximum value for the radial length of the close adhesion region is set as 0.4 mm or more. When the maximum value is less than 0.4 mm, close adhesion is insufficient to sometimes cause peeling of layers. More specifically, the maximum value is more preferably 0.6 mm or more and, further preferably, 0.7 mm or more in the vicinity of the outer circumference. Further, the upper limit of the maximum value near the outer circumference is 2 mm.

Further, the maximum value for the radial length of the close adhesion region near the inner circumference is, more preferably, 2.5 mm or more and, further preferably, 3 mm or more and, particularly preferably, 4 mm or more. Further, the upper limit for the maximum value near the inner circumference is 15 mm.

The optical information recording medium of this embodiment shows a form having close adhesion regions near the inner circumference and the outer circumference and this is a most preferred form, but the close adhesion region may be formed in the vicinity of one of the inner circumference and the outer circumference.

Now, the substrate and each of the layers of the optical information recording medium in the first embodiment are to be described in detail.

<Substrate>

As a substrate, various kinds of materials used as materials for substrates in existent optical information recording media can be arbitrarily selected and used.

Specifically, they can include, for example, glass, polycarbonates, acrylic resins such as polymethyl methacrylate; vinyl chloride series resins such as polyvinyl chloride and polyvinyl chloride copolymer; epoxy resins; amorphous polyolefins; polyesters; and metals such as aluminum and they may be used in combination as required.

Among the material described above, polycarbonates and amorphous polyolefins are preferred, with polycarbonates being particularly preferred in view of moisture resistance, dimensional stability and low cost. Further, the thickness of the substrate, is preferably, from 0.5 to 1.4 mm.

Guide grooves for tracking and irregularities representing information such as address signals (pre-grooves) are formed to the substrate. For attaining higher recording density, use of a substrate formed with pre-grooves at a narrower track pitch compared with CD-R or DVD-R is preferred. The track pitch of the pre-grooves is preferably within a range from 250 to 400 nm. Further, the depth (groove depth) of the pre-groove is within a range from 10 to 150 nm, preferably, within a range from 15 to 100 nm, more preferably, from 20 to 80 nm and, most preferably, from 20 to 60 mm.

On the surface of the substrate on the side provided with a reflection layer to be described later, an under coating layer is preferably formed with an aim of improving the planarity and improvement of the adhesion.

The material for the undercoating layer, can include, for example, polymeric materials such as polymethyl methacrylate, acrylic acid-methacrylic acid copolymer, styrene-maleic acid anhydride copolymer, polyvinyl alcohol, N-methylol acrylamide, styrene-vinyl toluene copolymer, chlorosulfonated polyethylene, nitrocellulose, polyvinyl chloride, chlorinated polyolefin, polyester, polyimide, vinyl acetate-vinyl chloride copolymer, ethylene-vinyl acetate copolymer, polyethylene, polypropylene and polycarbonate; and surface modifying agents such as silane coupling agents.

The undercoating layer can be formed by preparing a coating liquid by dissolving or dispersing the material described above into an appropriate solvent and then coating the coating liquid on the surface of a substrate by a coating method such as spin coating, dip coating, or extrusion coating. The thickness of the undercoating layer is, generally, within a range from 0.005 to 20 $\mu$m and, preferably, within a range from 0.01 to 10 $\mu$m.

<Reflection Layer>

For the reflection layer, a light reflecting material having a high reflectance to laser light is used. The reflectance is, preferably, 70% or more.

The light reflecting material having high reflectance can include, for example, metals and semimetals such as Mg, Se, Y, Ti, Zr, Hf, V, Nb, Ta, Cr, Mo, W, Mn, Re, Fe, Co, Ni, Ru, Rh, Pd, Ir, Pt, Cu, Ag, Au, Zn, Cd, Al, Ga, In, Si, Ge, Te, Pb, Po, Sn and Bi, or stainless steels. The light reflecting material may be used alone or may be used in a combination of two or more of them, or as an alloy. Among them, preferred are Cr, Ni, Pt, Cu, Ag, Au and Al, as well as stainless steels. Particularly preferred are Au, Ag, Al or alloys thereof and most preferred are Au, Ag or alloys thereof.

The reflection layer can be formed on the substrate, for example, by vapor depositing, sputtering or ion plating the light reflecting material described above. The thickness of the reflection layer is, generally, within a range of from 10 to 300 nm and, preferably, within a range from 50 to 200 nm. For ensuring the close adhesion region, a region not formed with the reflection layer is provided by using a mask.

The reflection layer described above is not always necessary in a case in which the reflectance of the recording layer is sufficiently high and the recording layer acts as the reflection layer in this case.

<Recording Layer>

The recording layer is a layer containing a dye compound and the dye compound is preferably at least one of triazole series compounds, phthalocyanine compounds, porphyrine series compound, aminobutadiene series compounds, cyanine series compound, and phthalocyanine compounds are preferably at least one of alkoxy substitutes, sulfone amide substitutes, sulfomoyl substitutes and sulfonic acid substitutes.

Further, dyes described, for example, in JP-A Nos. 4-74690, 8-127174, 11-53758, 11-334204, 11-334205, 11-334206, 11-334207, 2000-43423, 2000-108513 and 2000-158818 can be used in combination.

Further, not restricted to the dyes described above, organic compounds such as triazole compounds, triazine compounds, cyanine compounds, merocyanine compounds, aminobutadiene compounds, phthalocyanine compounds, sinnamic acid compounds, biologen compounds, azo compounds, oxonolbenzooxazole compound and benzotriazole derivatives can also be used suitably. Among the compounds, benzotriazole derivatives and phthalocyanine compounds are particularly preferred.

The recording layer is formed by dissolving a recording material such as the dye (organic materials, etc.) described above together with a binder into an appropriate solvent to prepare a recording layer coating solution, then coating the recording layer coating solution on the reflection layer formed on the surface of the substrate (on the substrate when the reflection layer is not provided) to form a coating film and then drying the same. Then, to provide the close adhesion region, after coating the recording layer coating solution, the region is flashed away with a solvent and cleared.

The concentration of the recording material in the recording layer coating solution is generally within a range from 0.01 to 15 mass %, preferably, within a range from 0.1 to 10 mass %, more preferably, within a range from 0.5 to 5 mass % and, most preferably, within a range from 0.5 to 3 mass %.

Further, as a method of dissolving the recording material and the like, a method using supersonic treatment, homogenizer or warming may be applied.

The solvent for preparing the recording layer coating solution can include, for example, esters such as butyl acetate, methyl lactate, ethyl lactate and cellosolve acetate; ketones such as methyl ethyl ketone, cyclohexanone and methyl isobutyl ketone; chlorinated hydrocarbons such as dichloromethane, 1,2-dichloroethane and chloroform; amides such as dimethylformamide; hydrocarbons such as methylcyclohexane; ethers such as tetrahydrofuran, ethyl ether and dioxane; alcohols such as ethanol, n-propanol, isopropanol, n-butanol, and diacetone alcohol; fluoric solvents such as 2,2,3,3-tetrafluoropropanol; and glycol ethers such as ethylene glycol monomethyl ether, ethylene glycol monoethyl ether and propylene glycol monomethyl ether.

The solvent described above can be used alone or as a combination of two or more of them while considering the solubility of the recording material to be used. In the coating solution, various kinds of additives such as antioxidant, UV-absorber, plasticizer and lubricant may be added depending on the purpose.

In a case of using a binder, examples thereof include natural organic polymeric materials such as gelatin, cellulose derivatives, dextran, rosin and rubber; and synthetic organic polymers, for example, hydrocarbonic resins such as polyethylene, polypropylene, polystyrene, and polyisobutylene, vinylic resins such as polyvinyl chloride, polyvinylidene chloride, and polyvinyl chloride-polyvinyl acetate copolymer, acrylic resins such as methylpolyacrylate and methyl polymethacrylate, polyvinyl alcohol, chlorinated polyethylene, epoxy resin, butyral resin, rubber derivatives, and initial condensates of thermosetting resins such as phenol formaldehyde resin. When using the binder as an additional material for the recording layer, the amount of the binder used is, generally, within a range from 0.01 to 50 times (mass ratio) and, preferably, within a range from 0.1 to 5 times (mass ratio) based on the recording material. The concentration of the recording material in the thus prepared coating solution is, generally, within a range from 0.01 to 10 mass % and, preferably, within a range of from 0.1 to 5 mass %.

The examples of coating method may include spraying, spin coating, dipping, roll coating, blade coating, doctor roll method and screen printing. The recording layer may be of single layer or multi-layer. The thickness of the recording layer is generally within a range from 20 to 500 nm, preferably, within a range from 30 to 300 nm and, more preferably, within a range from 50 to 100 nm.

If the coating temperature is at 23 to 50° C., no particular problems occur, and the coating temperature is preferably from 24 to 40° C. and more preferably from 25 to 37° C.

For the control of the viscosity, the coating temperature is preferably within a range from 23 to 50° C., more preferably, within a range from 24 to 40° C. and, further preferably, within a range from 25 to 37° C.

To prevent disk warpage, irradiation of UV-rays to the coating film is preferably conducted by using a pulse-type light irradiator (preferably, UV irradiator). The pulse interval is preferably 1 millisecond or less and, more preferably, 1 microsecond or less. There is no particular restriction on the amount of irradiation light per 1 pulse and it is, preferably, 3 kW/cm$^2$ or less and, more preferably, 2 kW/cm$^2$ or less.

Further, there is no particular restriction on the irradiation cycles, but 20 cycles or less are preferred and 10 cycles or less are more preferred.

Various kinds of discoloration inhibitors can be incorporated into the recording layer in order to improve the light fastness of the recording layer.

As the discoloration inhibitor, a single state oxygen quencher is generally used. The single state oxygen quenchers that have already been described in the known publications such as patent specifications can be utilized.

Specific examples of them include those described in JP-A Nos. 58-175693, 59-81194, 60-18387, 60-19586, 60-19587, 60-35054, 60-36190, 60-36191, 60-44554, 60-44555, 60-44389, 60-44390, 60-54892, 60-47069, 63-209995 and 4-25492, JP-B Nos. 1-38680, and 6-26028, the specification of GP-A No. 350399 and the Journal of Japanese Chemical Society, 1992, No. 10, p-1141.

The amount of the discoloration inhibitor such as the single state oxygen quencher to be used is, usually, within a range from 0.1 to 50 mass %, preferably, within a range from 0.5 to 45 mass %, more preferably, within a range from 3 to 40 mass % and, particularly, preferably, within a range from 5 to 25 mass % based on the amount of the compound used for recording.

<Barrier Layer>

The barrier layer is a layer formed optionally between the recording layer and the pressure sensitive adhesive layer or the adhesive layer to be described later. There is no particular restriction on the material constituting the barrier layer so long as it is a material capable of transmitting the laser light. The material is preferably a dielectric material and, more specifically, includes inorganic oxides, nitrides and sulfides such as ZnS, TiO$_2$, SiO$_2$, ZnS—SiO$_2$, GeO$_2$, Si$_3$N$_4$, Ge$_3$N$_4$, and MgF$_2$, and among them, ZnS—SiO$_2$ or SiO$_2$ is preferred. The barrier layer can be formed, for example, by sputtering or ion plating and the thickness is, preferably, from 1 to 100 nm. Further, in order to ensure the close adhesion region, using a mask provides a region where no barrier layer is formed.

In the optical information recording medium according to the invention, a cover sheet to be described later is appended on the recording layer or the barrier layer described above via a pressure sensitive adhesive layer or adhesive layer shown below.

<Pressure Sensitive Adhesive Layer>

The pressure sensitive adhesive layer is a layer formed for adhering the cover sheet to be described later, for which those conventionally known can be used generally. For the pressure sensitive adhesive, acrylic type pressure sensitive adhesives or rubber type pressure sensitive adhesives such as natural rubber, styrene-isoprene-styrene copolymer (SIS), and styrene-butadiene-styrene copolymer (SBS) can be appropriately selected and used. The pressure sensitive adhesive is preferably coated previously on the bonding surface of the cover sheet. The thickness of the pressure sensitive adhesive layer is within a range from 1 to 10 μm and, particularly preferably, from 2 to 5 μm.

<Adhesive Layer>

The adhesive layer is a layer, like the pressure sensitive adhesive layer, formed for adhering the cover sheet to be described later. The material constituting the adhesive layer can include photocurable resins and 2-component curable adhesives, with the photocurable resins being preferred and those having small curing shrinkage are preferred to prevent disk warpage. The photocurable resins may include, for example, UV-curable resin (UV-curable adhesive) such as "SD-640", "SD-661" and "SD-347" manufactured by Dainippon Ink Chemical Industry Co. Further, the thickness of the adhesive layer is, preferably, within a range from 1 to 1000 μm, more preferably, within a range from 5 to 500 μm, and, particularly preferably, within a range from 10 to 100 um in order to provide resiliency.

Other examples of the material forming the adhesive layer are shown below. The material includes resins curable under irradiation of radiation rays having two or more radiation functional double bonds in the molecule and may include, for example, acrylic acid esters, acryl amides, methacrylic acid esters, methacrylic acid amides, allyl compounds, vinyl ethers, and vinyl esters. Preferred are acrylate compounds and methacrylate compounds having two or more functional groups.

As specific examples for bi-functional compounds, those formed by adding acylic acid or methacrylic acid to aliphatic diols can be used and they include, for example, typically, ethylene glycol diacrylate, propylene glycol diacrylate, butanediol diacrylate, hexanediol diacrylate, diethylene glycol diacrylate, triethylene glycol diacrylate, tetraethylene glycol diacrylate, neopentyl glycol diacrylate, tripropylene glycol diacrylate, ethylene glycol dimethacrylate, propylene glycol dimethacrylate, butanediol dimethacrylate, hexanediol dimethacrylate, diethylene glycol dimethacrylate, triethylene glycol dimethacrylate, tetraethylene glycol dimethacrylate, neopentyl glyol dimethacrylate and tripropylene glycol dimethacrylate.

Further, polyether acrylate and polyether methacrylate formed by adding acrylic acid or methacrylic acid to polyether polyol such as polyethylene glycol, polypropylene glycol, or polytetramethylene glycol, and polyester acrylate and polyester methacrylate formed by adding acrylic acid or methacrylic acid to polyester polyol obtained from known dibasic acid or glycol can also be used.

Further, polyurethane acrylate or polyurethane methacrylate formed by adding acrylic acid or methacrylic acid to polyurethane formed by reacting known polyol, diol and polyisocyanate.

Further, those formed by adding acrylic acid or methacrylic acid to bisphenol-A, bisphenol-F, hydrogenated bisphenol-A, hydrogenated bisphenol-F or alkylene oxide adducts thereof, or those having cyclic structures such as isocyanuric acid alkylene oxide modified diacrylate, isocyanuric acid alkylene oxide modified dimethacrylate, tricyclodecane dimethanol diacrylate and tricyclodecane dimethanol dimethacrylate can also be used.

As the radiation rays, electron beams and ultraviolet rays can be used. In a case of using ultraviolet rays, it is necessary to add a photopolymerization initiator to the compounds described above. As the photopolymerization initiator, aromatic ketones are used. There is no particular restriction on the aromatic ketones and they form bright line spectra of a mercury lamp that is commonly used as a light source for UV-ray irradiation. Those having a relatively large light absorption coefficient at a wavelength of 254, 313 and 865 nm are preferred. Typical examples include acetophenone, benzophenone, benzoin ethyl ether, benzyl methyl ketal, benzyl ethyl ketal, benzoin isobutyl ketone, hydroxydimetyl phenyl ketone, 1-hydroxycyclohexyl phenyl ketone, 2,2-diethyxoaceto phenone, and Michler's ketone, and various aromatic ketones can be used. The mixing ratio of the aromatic ketones is from 0.5 to 20 mass parts, preferably, 2 to 15 mass parts and, further preferably, 3 to 10 mass parts based on 100 mass parts of the above compound. UV-ray curable adhesives with previous addition of optical initiators are commercially available, which may be used. As the UV-ray light source, a mercury lamp is used. The mercury lamp with 20 to 200 W/cm is used at a rate of 0.3 m/min to 20 m/min. The preferable distance between the substrate and the mercury lamp is generally from 1 to 30 cm.

For the electron beam accelerator, a scanning system, a double scanning system or a curtain beam system can be adopted and the curtain beam system capable of obtaining a high power at a relatively low cost is preferred. As for the electron beam characteristics, an accelerator voltage is from 100 to 1000 kV and, preferably from 150 to 300 kV, and an absorption dose is from 0.5 to 20 Mrad, preferably from 1 to 10 Mrad. When the acceleration voltage is 10 kV or lower, the energy transmission amount is insufficient and, on the other hand, when it exceeds 1000 kV, the efficiency of energy used for polymerization is reduced, which is not preferred in view of the cost.

<Cover Sheet>

There is no particular restriction on the material for forming the cover sheet so long as it is made of a transparent material, and polycarbonate, cellulose triacetate, or the like is preferred for the material. A material having a moisture absorption ratio of 5% or less at 23° C., RH 50% is preferred. Further, the cover sheet has a surface roughness, preferably, of 5 nm or less and a double refractive index, preferably, of 10 nm or less. "Transparent" means such an extent of transparency as transmitting a laser light for recording and playback (transmittance: 80% or higher).

The thickness of the cover sheet is, preferably, within a range from 0.01 to 0.2 mm, more preferably, within a range from 0.03 to 0.1 mm and, further preferably, within a range from 0.05 to 0.095 mm.

The method of appending the cover sheet on the recording layer or the barrier layer by using the pressure sensitive adhesive layer may include a method of coating a pressure sensitive adhesive on the cover sheet, drying the solvent, placing the cover sheet via the pressure sensitive adhesives on the intermediate layer and appending the cover sheet by applying a pressure by a roller.

For the viscosity control, the coating temperature of the pressure sensitive adhesives is, preferably, within a range from 23 to 50° C., more preferably, within a range from 24 to 40° C. and, further preferably, within a range from 25 to 37° C. After the coating, it is dried, preferably, at 50 to 300° C., more preferably, at 80 to 200° C. and, further preferably, at 100 to 150° C. Further, the temperature upon bonding the cover sheet is, preferably, within a range from 0 to 100° C. and, more preferably, within a range from 15 to 50° C.

Further, the cover sheet can be bonded also by coating a pressure sensitive adhesive on a releasing film having releasability, drying the solvent, then bonding the cover sheet, peeling the releasable film and providing pressure sensitive adhesives on the cover sheet, and then bonding the same on the recording layer or the barrier layer. This method is preferred, particularly, in a case where the solvent contained in the pressure sensitive adhesive dissolves the cover sheet.

In a case of using a sheet in which a pressure sensitive adhesive layer is disposed on the releasable film, there is no particular restriction on the film used as a substrate so long as it is insoluble to the solvent contained in the pressure sensitive adhesives and, for example, plastic films such as of polyethylene terephthalate, polypropylene, polyethylene and vinyl chloride, paper such as kraft paper, high quality paper, clay coated paper and Japanese paper, non-woven fabrics such as of rayon, polyester, woven fabrics made of synthetic fibers such as polyester, nylon and acryl, and metal foils such as of aluminum, copper and stainless steel are used, and a plastic film is preferred in view of coating a thin and uniform releasable layer successively on the film.

Further, as the releasing agent to be used, various kinds of releasing agents conventionally used such as silicone type releasing agents or long-chained alkyl series releasing agents may be appropriately selected and used.

A second embodiment of an optical information recording according to the invention is to be described as follows.

An optical information recording medium according to the invention is a disk-shaped optical information recording medium comprising, optionally, a reflection layer, a recording layer, a barrier layer, a pressure sensitive adhesive layer or an adhesive layer and a cover sheet in this order on a substrate, and having a central hole, a track pitch of 250 to 400 nm and a groove depth of 10 to 150 nm, for recording and playing back information by being irradiated with a laser light at a wavelength of 500 nm or less, wherein the substrate and the barrier layer are closely adhered via the pressure sensitive adhesive layer or the adhesive layer in at least a portion of a region near the inner circumference and/or near the outer circumference, and the maximum value for the radial length of the close adhesion region is 0.4 mm or more.

Figure 3:
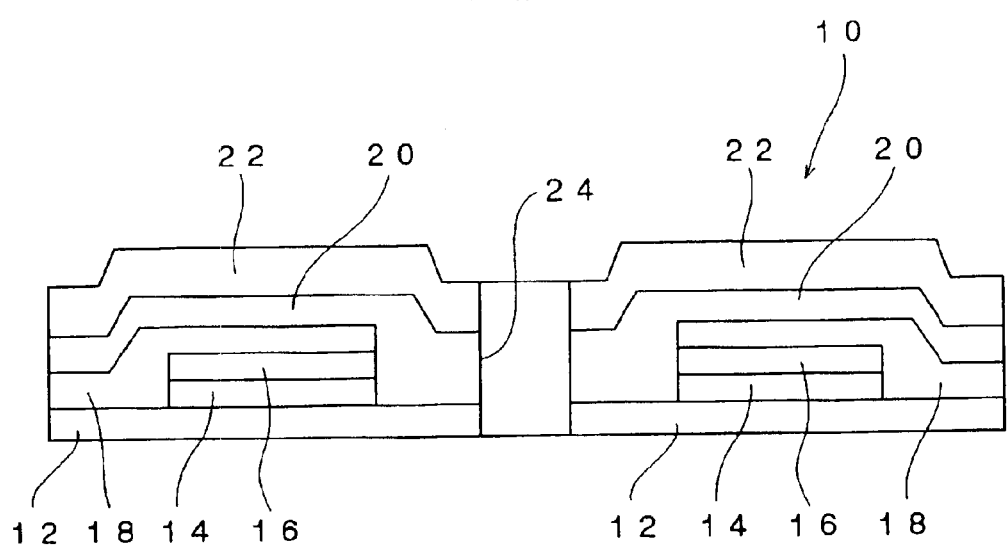
FIG. 3 is a schematic cross sectional view of another example taken along line 2—2 in FIG. 1.

FIG. 1 and FIG. 3 show, respectively, an upper plan view and a schematic cross sectional view of an example of an optical information recording medium of the second embodiment. An optical information recording medium 10 has, on a substrate 12, a reflection layer 14, a recording layer 16, a barrier layer 18, an adhesive layer 20 and a cover sheet 22 in this order and has a central hole 24 at a central portion. In the optical information recording medium 10, the substrate 12 and the barrier layer 18 are closely adhered near the outer circumference and near the inner circumference each at four regions (hereinafter referred to as "close adhesion region"). The maximum value for the radial length of the close adhesion region at each four position disposed near the outer circumference and near the inner circumference is 0.5 mm. Then, the reflection layer 14 and the recording layer 16 are firmly adhered closely on the substrate 12 by the presence of the close adhesion regions. Accordingly, peeling for each of layers of the optical information recording medium 10 can be prevented. In FIG. 1, the close adhesion regions are disposed to the outer circumference and the inner circumference each at four positions but the invention is not restricted only to them. It is preferred that the close adhesion region is provided in plurality or provided over the entire circumference of the outer circumference and the inner circumference.

In the invention, while the maximum value for the radial length of the close adhesion region is set as 0.4 mm or more. When the maximum value is less than 0.4 mm, close adhesion is insufficient to sometimes cause peeling of layers. More specifically, the maximum value is, more preferably, 0.6 mm or more and, further preferably, 0.7 mm or more near the outer circumference. Further, the upper limit of the maximum value near the outer circumference is 2 mm.

Further, the maximum value for the radial length of the close adhesion region near the inner circumference is, more preferably, 2.5 mm or more and, further preferably, 3 mm or more and, particularly preferably, 4 mm or more. Further, the upper limit for the maximum value near the inner circumference is 15 mm.

The optical information recording medium of this embodiment shows a form having close adhesion regions near the inner circumference and the outer circumference and this is a most preferred form, but the close adhesion region may be formed near one of the inner circumference and the outer circumference.

Now, the substrate and each of the layers of the optical information recording medium in the second embodiment are to be described in detail.

<Substrate>
Substrates identical with those described for the first embodiment can be used.

<Reflection Layer>
Reflection layers identical with those described for the first embodiment can be used.

<Recording Layer>
Recording layers identical with those described for the first embodiment can be used.

<Barrier Layer>
The barrier layer is a layer formed between the recording layer and the pressure sensitive adhesive layer or the adhesive layer to be described later. There is no particular restriction on the material constituting the barrier layer so long as it is a material capable of transmitting the laser light. The material is preferably a dielectric material and, more specifically, includes inorganic oxides, nitrides and sulfides such as ZnS, $TiO_2$, $SiO_2$, ZnS—$SiO_2$, $GeO_2$, $Si_3N_4$, $Ge_3N_4$, and $MgF_2$, ZnS—$SiO_2$ or $SiO_2$ being preferred. The barrier layer can be formed, for example, by sputtering or ion plating, and the thickness is, preferably, from 1 to 100 nm.

In the optical information recording layer of the invention, a cover sheet to be described later is bonded via a pressure sensitive adhesive layer or an adhesive layer on the recording layer or the barrier layer described above.

<Pressure Sensitive Adhesive Layer>
Pressure sensitive adhesive layers identical with those described for the first embodiment can be used.

<Adhesive Layer>
Adhesive layers identical with those described for the first embodiment can be used.

<Cover Sheet>
There is no particular restriction on the material forming the cover sheets so long as it is made of a transparent material, and polycarbonate, cellulose triacetate, acrylic polymers, or the like is preferred for the material. Those materials having a moisture absorption ratio of 5% or less at 23° C., RH 50% are preferred. Further, the cover sheet has a surface roughness, preferably, of 5 nm or less and a double refractive index, preferably, of 10 nm or less.

"Transparent" means such an extent of transparency as transmitting a laser light for recording and playback (transmittance: 80% or higher).

The thickness of the cover sheet is, preferably, within a range from 0.01 to 0.2 mm, more preferably, within a range from 0.03 to 0.1 mm and, further preferably, within a range from 0.05 to 0.095 mm.

The method of appending the cover sheet on the barrier layer by using the pressure sensitive adhesive layer can include a method of coating a pressure sensitive adhesive on the cover sheet, drying the solvent, placing the cover sheet via the pressure sensitive adhesives on the intermediate layer and appending the cover sheet by applying a pressure by a roller.

For the viscosity control, the coating temperature of the pressure sensitive adhesive is, preferably, within a range from 23 to 50° C., more preferably, within a range from 24 to 40° C. and, further preferably, within a range from 25 to 37° C. After the coating, it is dried, preferably, at 50 to 300° C., more preferably, at 80 to 200° C. and, further preferably, at 100 to 150° C. Further, the temperature upon bonding the cover sheet is, preferably, within a range from 0 to 100° C. and, more preferably, within a range from 15 to 50° C.

Further, the cover sheet can also be bonded by coating a pressure sensitive adhesive on a releasing film having releasability, drying the solvent, then bonding the cover sheet, peeling the releasable film, providing pressure sensitive adhesives on the cover sheet, and then bonding the same on the barrier layer. This method is preferred particularly in a case where the solvent contained in the pressure sensitive adhesive dissolves the cover sheet.

In a case of using a sheet in which a pressure sensitive adhesive layer is disposed on the releasable film, there is no particular restriction on the film used as a substrate so long as it is insoluble to the solvent contained in the pressure sensitive adhesives and, for example, plastic films such as of polyethylene terephthalate, polypropylene, polyethylene and vinyl chloride, paper such as kraft paper, high quality paper, clay coated paper and Japanese paper, non-woven fabrics such as of rayon or polyester, woven fabrics made of synthetic fibers such as of polyester, nylon and acryl, and metal foils such as of aluminum, copper and stainless steel are used, and a plastic film is preferred in view of coating the releasable layer successively on the film thinly and uniformly.

Further, as the releasing agent to be used, various kinds of releasing agents conventionally used such as silicone type releasing agents or long-chained alkyl series releasing agents can be appropriately selected and used.

A third embodiment of an optical information recording according to the invention is to described as follows.

An optical information recording medium according to the invention is a disk-shaped optical information recording medium comprising optionally a reflection layer, a recording layer, a barrier layer, a pressure sensitive adhesive layer or an adhesive layer and a cover sheet in this order on a substrate, and having a central hole, a track pitch of 250 to 400 nm and a groove depth of 10 to 150 nm, for recording and playing back information by being irradiated with a laser light at a wavelength of 500 nm or less, in which the barrier layer surrounds the outer circumferential edge and/or inner circumferential edge of the recording layer.

Figure 4:
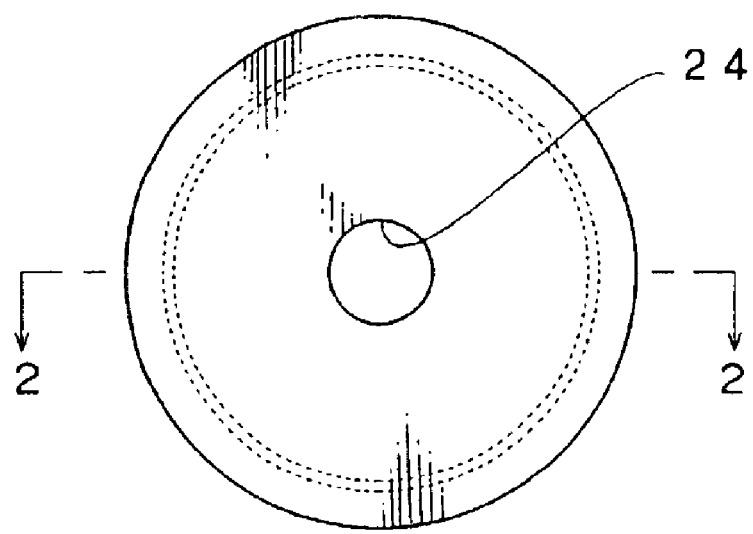
FIG. 4 is an upper plan view showing a disk-shaped optical information recording medium of another embodiment in the present invention.
Figure 5:
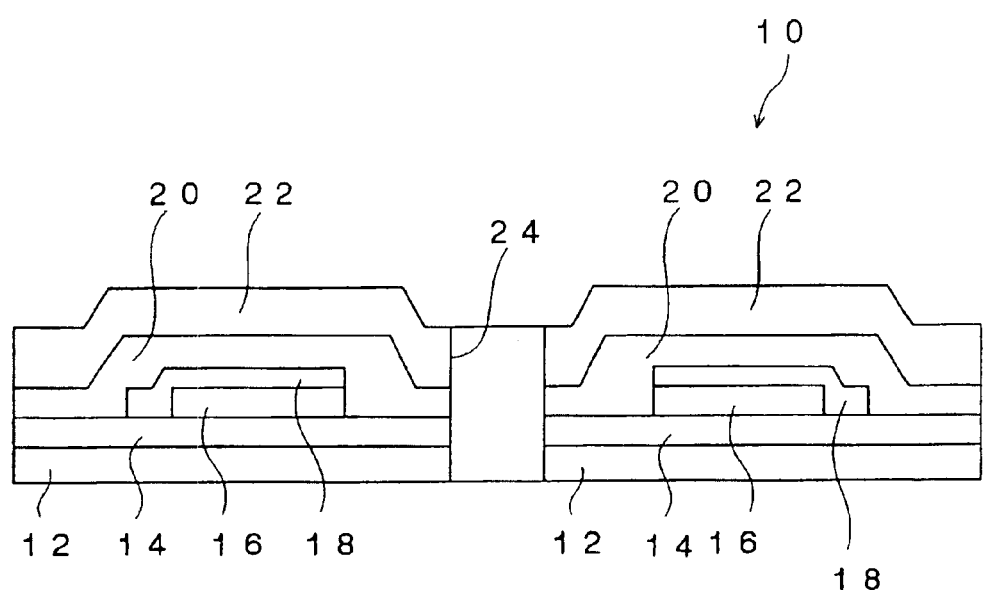
FIG. 5 is a schematic cross sectional view of an example taken along line 2—2 in FIG. 4.

FIG. 4 and FIG. 5 show, respectively, an upper plan view and a schematic cross sectional view of an example of an optical information recording medium of the third embodiment. An optical information recording medium 10 has, on a substrate 12, a reflection layer 14, a recording layer 16, a barrier layer 18, a pressure sensitive adhesive layer 20 and a cover sheet 22 in this order and has a central hole 24 at a central portion as shown in FIG. 5. In FIG. 4, the outer broken line shows the outer circumference of the barrier layer 18 and the inner broken line shows the outer circumference of the recording layer. That is, as shown in FIG. 5, the barrier layer 18 is formed to extend as far as the outside of the outer circumference of the recording layer 18. More specifically, the barrier layer 18 is bonded via the adhesive layer 20 with the cover sheet 22 in a state of surrounding at the outer circumferential edge thereof the recording layer 16. Accordingly, since the recording layer 16 is not exposed to the outside and protected by the barrier layer 18, it is excellent in storability.

The cover sheet 22 of the optical information recording medium 10 is adhered via the adhesive layer 20 to the reflection layer 14 and the barrier layer 18, in which the maximum value for the radial length of the closer adhesion region between the adhesive layer 20 and the reflection layer 14 is preferably 0.4 mm or more. Sufficient adhesion can be obtained to suppress peeling of the layer by making the maximum value 0.4 mm or more. More specifically, it is, preferably, 0.6 mm or more and, further preferably, 0.8 mm or more near the outer circumference. Further, it is more preferably 2.5 mm or more and, further preferably, 3 mm or more and, particularly preferably, 4 mm or more near the inner circumference.

Figure 6:
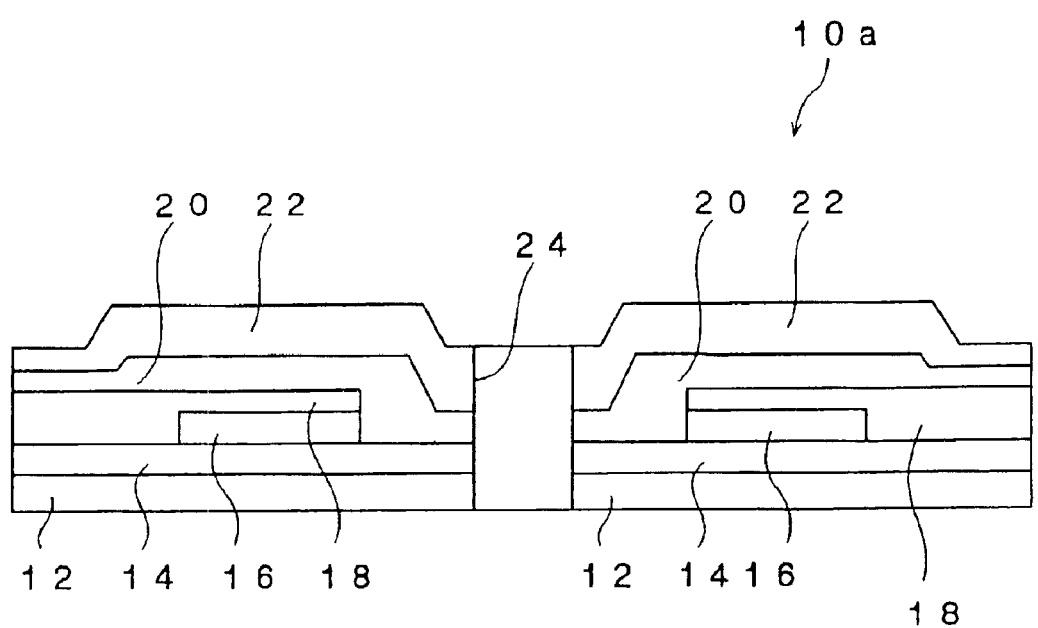
FIG. 6 is a schematic cross sectional view of another modified example taken along line 2—2 in FIG. 4.
Figure 7:
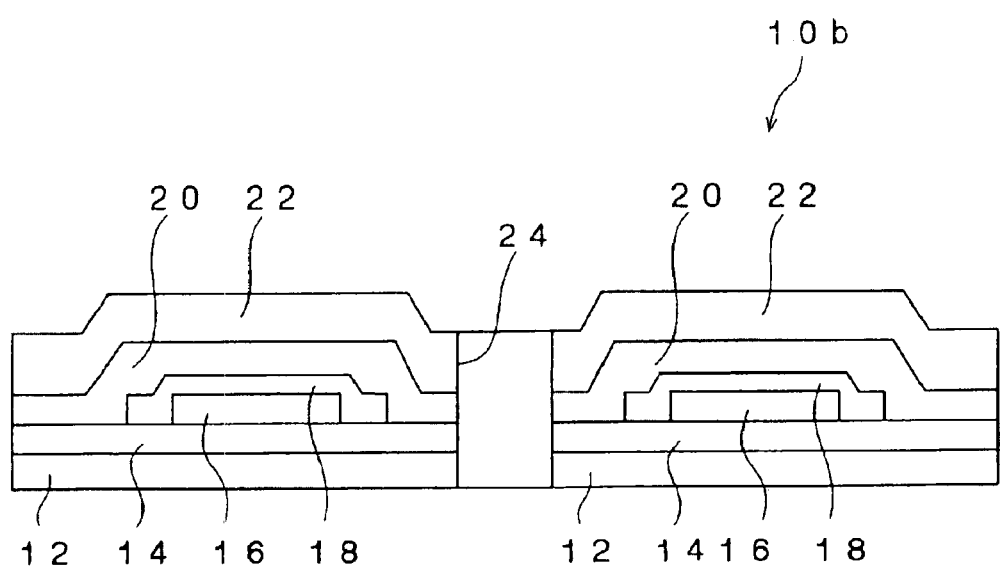
FIG. 7 is a schematic cross sectional view of yet another modified example taken along line 2—2 in FIG. 4.

Then, two modified examples of the optical information recording medium according to the third embodiment are shown in FIG. 6, FIG. 7. In FIG. 6 and FIG. 7, constituent elements that are identical to those in the optical information recording medium 10 shown in FIG. 4 and FIG. 5 use the same reference numerals. An optical information recording medium 10a shown in FIG. 6 is an example in which the barrier layer 18 is formed to extend as far as the outer circumferential edge of the substrate 12 while an optical information recording medium 10b shown in FIG. 7 is an example in which the barrier layer 18 is formed to extend as far as the outside to the outer circumference and inside to the inner circumference of the recording layer 16. In each of the examples, the barrier layer 18 surrounds the recording layer 16 and is excellent in storability. In the example shown in FIG. 7, both of the inner circumferential edge and the outer circumferential edge of the recording layer 16 are covered with the barrier layer 18 and this is most preferred.

As described above, the outer circumferential diameter and/or inner circumferential diameter are different between the barrier layer and the recording layer, and the difference between the outer circumferential diameter of the barrier layer and the outer circumferential diameter of the recording layer is preferably from 0.4 to 4 mm, and, more preferably, from 0.8 to 2 mm. Further, the difference between the inner circumferential diameter of the barrier layer and the inner circumferential diameter of the recording layer is, preferably, from 0.4 to 15 mm and, more preferably, from 0.8 to 7 mm.

Now, the substrate and each of the layers of the optical information recording medium in the third embodiment are to be described in detail.

<Substrate>

Substrates identical with those described for the first and second embodiments can be used.

<Reflection Layer>

For the reflection layer, light reflecting material of high reflectance to the laser light is used. The reflectance is 70% or higher.

Light reflecting material of high reflectance used for the reflecting layer, identical with those described with the first and second embodiments can be used.

The reflection layer is formed on the substrate by vapor depositing, sputtering or ion plating the light reflecting substance described above. The thickness of the reflection layer is generally within a range from 10 to 300 nm and, preferably, within a range from 50 to 200 nm.

The reflection layer described above is not always necessary in a case where the reflectance of the recording layer to be described later is sufficiently high in which the recording layer acts as a reflection layer.

<Recording Layer>

The recording layer is a layer containing a dye compounds. Identical dye compound and dye with those described in the first and second embodiments can be used.

The recording layer is formed by dissolving a recording material such as the dye described above (organic material or the like) together with the binder into an appropriate solvent to prepare a recording layer coating solution, then coating the recording layer coating solution on the reflection layer formed to the surface of the substrate (on the substrate in a case where the reflection layer is not disposed) to form a coating film and then drying the same. Then, for surrounding the recording layer with a barrier layer to be described later, after coating the recording layer coating solution, the region for the outer circumference and/or inner circumference is flashed away with a solvent and cleared.

The concentration of the recording material in the recording layer coating solution, method of dissolving the recording material and the like, solvent used for preparing the recording layer coating solution, method of using the solvent, use of additives, use of binder, method of coating the coating solution, thickness of the recording layer, coating temperature of the coating solution, a method of irradiating UV-rays to the coating film and discoloration inhibitor to be contained in the recording layer are identical with those in the first and second embodiments.

<Barrier Layer>

Barrier layers identical with those described for the second embodiment can be used.

<Pressure Sensitive Adhesive Layer>

Pressure sensitive adhesive layers identical with those described for the first and second embodiments can be used.

<Adhesive Layer>

Adhesive layers identical with those described for the first and second embodiments can be used.

<Cover Sheet>

Cover sheets identical with those described for the second embodiment can be used.

EXAMPLES

The present invention is to be described specifically by way of examples of the first embodiment but the invention is not restricted to the following examples.

Example 1

Ag was sputtered in an Ar atmosphere using CUBE manufactured by Unaxis Co. on the surface of a substrate made of an injection molded polycarbonate of 1.1 mm thickness, 120 mm outer diameter and 15 mm inner diameter, having spiral grooves (track pitch: 340 nm, groove depth: 30 nm, groove width: 15 nm) on the surface having the grooves to form a reflection layer of 120 nm thickness. Upon sputtering, a mask was used so as not to form a reflection layer in the regions near the inner circumference and near the outer circumference shown by broken lines in FIG. 1, for ensuring close adhesion regions.

Then, 2 g of dye A represented by the following structural formula was dissolved in 100 ml of 2,2,3,3-tetrafluoropropanol to prepare a dye coating solution. The dye coating solution was coated uniformly on the substrate by a spin coating method to form a recording layer with a thickness inside the groove of 100 nm and the thickness on the land portion of 70 nm. Then, regions for portions of inner circumference and outer circumference not formed with the reflection layer were flashed away and cleared. Then, annealing was conducted by using a clean oven at 40° C. for one hour. In this case, the substrate was supported to a vertical stack pole at a gap kept by a spacer.

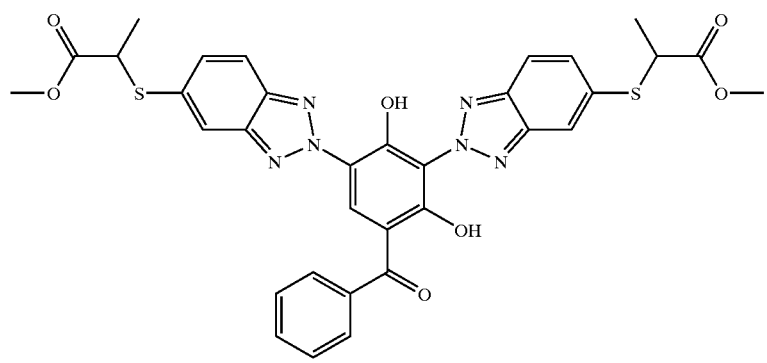

Dye A

After annealing, ZnS—SiO$_2$ (8:2) was sputtered at a thickness of 50 nm by RF sputtering under the conditions at a sputtering power of 4 kW, a pressure of $2\times10^{-2}$ hPa and for 10 sec, to form a barrier layer. In this case, the mask used for forming the reflection layer was used so as not to form a barrier layer in the regions for portions of the inner circumference and the outer circumference.

A polycarbonate cover sheet (PUREACE manufactured by Teijin Co., thickness: 85 μm) coated with pressure sensitive adhesives at a thickness of 15 μm on the surface was bonded while centering the substrate and the cover sheet to each other. Near the outer circumference and the inner circumference, the maximum value for the radial length of the close adhesion region where the substrate and the cover sheet were closely adhered via the pressure sensitive adhesive layer was 0.5 mm. An optical information recording medium of Example 1 was obtained by the steps described above.

Comparative Example 1

An optical information recording medium of Comparative Example 1 was obtained in the same manner as in Example 1 except for forming the entire surface of the reflection layer to extend as far as the edge of the substrate in Example 1.

Comparative Example 2

An optical information recording medium of Comparative Example 2 was obtained in the same manner as in Example 1 except for forming the entire surface of the recording layer to extend as far as the edge of the substrate in Example 1.

Comparative Example 3

An optical information recording medium of Comparative Example 3 was obtained in the same manner as in Example 1 except for forming the barrier layer to extend as far as the edge of the substrate in Example 1.

Comparative Example 4

An optical information recording medium of Comparative Example 4 was obtained in the same manner as in Example 1 except for changing the radial length of the close adhesion region in which the substrate and the cover sheet were closely adhere via the pressure sensitive adhesive layer to 0.1 mm in Example 1.

[Evaluation]

For the optical information recording media obtained in Example 1 and Comparative Examples 1 to 4, the following (1) peeling test, (2) dropping test and (3) evaluation for recording characteristics were conducted.

(1) Peeling Test

A test of appending and releasing a gum (adhesive) tape to and from the surface of the obtained optical information recording media on the side of the cover sheet was conducted and evaluation was made in accordance with the following evaluation standard. Results are shown in Table 1.

[Evaluation Standards]
O: not peeled
x: peeled (2) Dropping Test

Test specimens were dropped from a height of 1 m to a concrete floor for 20 times, peeling at the outer end of the substrate was observed and evaluated in accordance with the following evaluation standards. Results are shown in Table 1.

[Evaluation Standard]
A: peeling at the outer peripheral end of the substrate was scarcely observed
B: peeling at the outer peripheral end of the substrate was observed (3) Evaluation for Recording Characteristics Recording was conducted at a linear velocity of 4.9 m/s and for a bit length of 160 nm by DDU1000 (manufactured by Pulstech Co.), and C/N before and after the (1) peeling test described above was measured. Results of measurements are shown in Table 1.

TABLE 1

|  | Peeling test | Dropping test | C/N (dB) before test | C/N (dB) after peeling test |
|---|---|---|---|---|
| Example 1 | o | A | 46 | 46 |
| Comparative Example 1 | x | B | 46 | 42 |
| Comparative Example 2 | x | B | 46 | 41 |
| Comparative Example 3 | x | B | 46 | 42 |
| Comparative Example 4 | x | B | 46 | 42 |

From Table 1, it can be seen that the optical information recording medium of Example 1 has high close adhesion and high recording characteristics in view of the results for the (1) peeling test, (2) dropping test and (3) evaluation recording characteristics.

The present invention is to be described specifically by way of examples of the second embodiment but the invention is not restricted to the following examples.

Example 2

Ag was sputtered in an Ar atmosphere using CUBE manufactured by Unaxis Co. on the surface of a substrate made of an injection molded polycarbonate of 1.1 mm thickness, 120 mm outer diameter and 15 mm inner diameter, having spiral grooves (trackpitch: 340 nm, groove depth: 30 nm, groove width: 15 nm) on the surface having the grooves to form a reflection layer of 120 nm thickness. Upon sputtering, a mask was used so as not to form a reflection layer in the regions near the inner circumference and near the outer circumference shown by broken lines in FIG. 1, for ensuring close adhesion regions.

Then, 2 g of dye A represented by the structural formula described above was dissolved in 100 ml of 2,2,3,3-tetrafluoropropanol to prepare a dye coating solution. The dye coating solution was coated uniformly on the substrate by a spin coating method to form a recording layer with a thickness inside the groove of 100 nm and the thickness on the land portion of 70 nm. Then, regions for portions of inner circumference and outer circumference not formed with the reflection layer were flashed away and cleared. Then, annealing was conducted by using a clean oven at 40° C. for one hour. In this case, the substrate was supported to a vertical stack pole at a gap kept by a spacer.

After annealing, $ZnS$—$SiO_2$ (8:2) was sputtered at a thickness of 50 nm by RF sputtering under the conditions at a sputtering power of 4 kW, a pressure of $2 \times 10^{-2}$ hPa and for 10 sec, to form a barrier layer. In this case, the mask used for forming the reflection layer was used so as not to form a barrier layer in the regions for portions of the inner circumference and the outer circumference.

ex 8204 manufactured by Dainippon Ink Chemical Industry Co. (adhesive) was dispensed in a circular form (with substrate rotated by about one turn in a state with nozzle being fixed) and then a polycarbonate cover sheet (PUREACE manufactured by Teijin Co., thickness: 85 μm) was placed on the substrate with the substrate and the cover sheet being centered to each other, rotated for 3 sec at a cycle of 5000 rpm and the adhesives were spread over the entire surface and surplus adhesives were shaken off. Then, UV-rays were irradiated to cure the adhesives. As described above, an adhesive layer of 25 μm thickness could be formed with no bubbles. The total thickness for the cover sheet and the adhesive layer was set to 100 μm. The optical information recording medium of Example 2 was obtained by the steps described above.

Comparative Example 5

An optical information recording medium of Comparative Example 5 was obtained in the same manner as in Example 2 except for forming the entire surface of the recording layer to extend as far as the edge of the substrate in Example 2.
[Evaluation]

For the optical information recording media obtained in Example 2 and Comparative Example 5, the following (1) peeling test, (2) dropping test and (3) evaluation for recording characteristics were conducted.
(1) Peeling Test A test of appending and releasing a gum (adhesive) tape to and from the surface of the obtained optical information recording media on the side of the cover sheet was conducted and evaluation was made in accordance with the following evaluation standard. Results are shown in Table 2.
[Evaluation Standards]
O: not peeled
x: peeled
(2) Dropping Test Test specimens were dropped from a height of 1 m to a concrete floor for 20 times, peeling at the outer end of the substrate was observed and evaluated in accordance with the following evaluation standards. Results are shown in Table 2.
[Evaluation Standard]
A: peeling at the outer peripheral end of the substrate was scarcely observed
B: peeling at the outer peripheral end of the substrate was slightly observed
C: peeling at the outer peripheral end of the substrate was considerably observed
(3) Evaluation for Recording Characteristics Recording was conducted at a linear velocity of 4.9 m/s and for a bit length of 160 nm by DDU1000 (manufactured by Pulstech Co.), and C/N before and after the (1) peeling test and (2) dropping test described above was measured. Results of measurements are shown in Table 2.

TABLE 2

|  | Peeling test | Dropping test | C/N (dB) before test | C/N (dB) after peeling test | C/N (dB) after dropping test |
|---|---|---|---|---|---|
| Example 2 | o | A | 46 | 46 | 46 |
| Comparative Example 5 | x | C | 46 | 43 | 42 |

From Table 2, it can be seen that the optical information recording medium of Example 2 has high close adhesion and high recording characteristics in view of the results for the (1) peeling test, (2) dropping test and (3) evaluation recording characteristics.

The present invention is to be described specifically by way of examples of the third embodiment but the invention is not restricted to the following examples.

Example 3

Ag was sputtered in an Ar atmosphere using CUBE manufactured by Unaxis Co. on the surface of a substrate made of an injection molded polycarbonate of 1.1 mm thickness, 120 mm outer diameter and 15 mm inner diameter, having spiral grooves (track pitch: 340 nm, groove depth: 30 nm, groove width: 15 nm) on the surface having the grooves to form a reflection layer of 120 nm thickness.

Then, 2 g of dye A represented by the structural formula described above was dissolved in 100 ml of 2,2,3,3-tetrafluoropropanol to prepare a dye coating solution. The dye coating solution was coated uniformly on the substrate by a spin coating method to form a recording layer with a thickness inside the groove of 100 nm and the thickness on the land portion of 70 nm. Then, regions for portions of inner circumference and outer circumference not formed with the reflection layer were flashed away and cleared. Then, annealing was conducted by using a clean oven at 40° C. for one hour. In this case, the substrate was supported to a vertical stack pole at a gap kept by a spacer.

After annealing, ZnS—SiO$_2$ (8:2) was sputtered at a thickness of 50 nm by RF sputtering under the conditions at a sputtering power of 4 kW, a pressure of 2×10$^{-2}$ hPa and for 10 sec, to form a barrier layer. In this case, the barrier layer was formed such that the outer circumference thereof extended 1 mm beyond the outer circumference of the recording layer so that the barrier layer would surround the outer circumferential edge of the recording layer.

Ex 8204 manufactured by Dainippon Ink Chemical Industry Co. (adhesive) was dispensed in a circular form (with substrate rotated by about one turn in a state with nozzle being fixed) and then a polycarbonate cover sheet (PUREACE manufactured by Teijin Co., thickness: 85 μm) was placed on the substrate with the substrate and the cover sheet being centered to each other, rotated for 3 sec at a cycle of 5000 rpm and the adhesives were spread over the entire surface and surplus adhesives were shaken off. Then, UV-rays were irradiated to cure the adhesives. As described above, an adhesive layer of 25 μm thickness could be formed with no bubbles. The total thickness for the cover sheet and the adhesive layer was set to 100 μm. The optical information recording medium of Example 3 was obtained by the steps described above.

Comparative Example 6

An optical information recording medium of Comparative Example 6 was obtained in the same manner as in Example 3 except for forming the recording layer such that the outer circumference thereof is situated beyond the outer side of the outer circumference of the barrier layer in Example 3.

[Evaluation]

For the optical information recording media obtained in Example 3 and Comparative Example 6, C/N at the outer circumference in the initial state before storage and after stored for 24 hours in atmosphere at 80° C., 85% RH was measured. C/N was measured by recording at a linear velocity of 4.0 m/s for a bit length of 160 nm by using DDU1000 (manufactured by Pulstech Co.). Results are shown in Table 3.

TABLE 3

|  | C/N (before storage) | C/N (after storage) |
|---|---|---|
| Example 3 | 46 dB | 45 dB |
| Comparative Example 6 | 46 dB | 40 dB |

It can be seen from Table 3 that C/N was scarcely changed in the optical information recording medium of Example 3. On the contrary, C/N became lower and storability was low in the optical information recording medium of Comparative Example 6.

The present invention can provide an optical information recording medium having close adhesion between each of the layers and having stable recording and playing back characteristics and an optical information recording medium of high storability and having stable recording and playing back characteristics.

What is claimed is:

1. A disk-shaped optical information recording medium comprising a recording layer, at least one of a pressure sensitive adhesive layer and an adhesive layer, and a cover sheet in this order on a substrate, and having a central hole, a track pitch of 250 to 400 nm and a groove depth of 10 to 150 nm, the recording medium for recording and playing back information by being irradiated with a laser light at a wavelength of no more than 500 nm, wherein the substrate and the cover sheet are closely adhered via the at least one of the pressure sensitive adhesive layer and the adhesive layer at a region, which includes at least a portion of at least one of an inner circumference vicinity and an outer circumference vicinity.

2. A disk-shaped optical information recording medium according to claim 1, wherein a maximum value for a radial length of the region, at which the substrate and the cover sheet are closely adhered, is at least 0.4 mm.

3. A disk-shaped optical information recording medium according to claim 1, wherein the substrate and the cover sheet are closely adhered over all of the at least one of the inner circumference vicinity and the outer circumference vicinity.

4. A disk-shaped optical information recording medium according to claim 1, wherein a maximum value for a radial length of the region in the outer circumference vicinity, at which region the substrate and the cover sheet are closely adhered, is at least 0.7 mm.

5. A disk-shaped optical information recording medium according to claim 1, wherein a maximum value for a radial length of the region in the inner circumference vicinity, at which region the substrate and the cover sheet are closely adhered, is at least 4 mm.

6. A disk-shaped optical information recording medium according to claim 1, wherein the groove depth is from 20 to 60 nm.

* * * * *